United States Patent
Ashwood-Smith (10) Patent No.: US 9,860,350 B2
(45) Date of Patent: Jan. 2, 2018

(54) TRANSPORT SOFTWARE DEFINED NETWORKING (SDN)—LOGICAL TO PHYSICAL TOPOLOGY DISCOVERY

(71) Applicant: Huawei Technologies Co., Ltd., Shenzhen (CN)

(72) Inventor: Peter Ashwood-Smith, Gatineau (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/709,697

(22) Filed: May 12, 2015

(65) Prior Publication Data
US 2016/0337171 A1 Nov. 17, 2016

(51) Int. Cl.
*H04L 12/28* (2006.01)
*H04L 29/08* (2006.01)
*H04L 12/24* (2006.01)

(52) U.S. Cl.
CPC ............ *H04L 69/323* (2013.01); *H04L 41/12* (2013.01)

(58) Field of Classification Search
CPC ......... H04L 45/02; H04L 45/46; H04L 49/25; H04L 49/70; H04L 12/4633
See application file for complete search history.

(56) References Cited

U.S. PATENT DOCUMENTS

| | | | |
|---|---|---|---|
| 6,757,258 B1 * | 6/2004 | Pillay-Esnault | ........ H04L 45/02 370/254 |
| 7,903,554 B1 | 3/2011 | Manur et al. | |
| 8,014,278 B1 | 9/2011 | Subramanian et al. | |
| 8,243,594 B1 | 8/2012 | Fotedar et al. | |
| 8,942,256 B1 * | 1/2015 | Barth | ...................... H04L 45/02 370/255 |
| 9,225,597 B2 | 12/2015 | Tubaltsev et al. | |
| 9,300,592 B2 | 3/2016 | Macchiano et al. | |
| 9,450,817 B1 | 9/2016 | Bahadur et al. | |
| 9,641,249 B2 | 5/2017 | Kaneriya et al. | |

(Continued)

FOREIGN PATENT DOCUMENTS

| CN | 102158348 A | 8/2011 |
|---|---|---|
| CN | 103501236 A | 1/2014 |

(Continued)

OTHER PUBLICATIONS

Haleplidis, Ed., et al., "Software-Defined Networking (SDN): Layers and Architecture Terminology," RFC 7246, Jan. 2015, 36 pages.

(Continued)

*Primary Examiner* — Melanie Jagannathan
(74) *Attorney, Agent, or Firm* — Conley Rose, P.C.

(57) ABSTRACT

A physical layer network element comprising one or more physical ports, a network packet interface, and a processor coupled to the network packet interface. The processor and the network packet interface may be configured to inspect adjacency discovery messages forwarded across the network packet interface between adjacent logical nodes operating at a network layer and map at least one of the physical ports to at least one of the adjacent logical nodes, wherein the network packet interface and the processor are not configured to modify header information contained in the adjacency discovery messages forwarded across the network packet interface.

20 Claims, 6 Drawing Sheets

(56) References Cited

U.S. PATENT DOCUMENTS

| | | | |
|---|---|---|---|
| 2002/0118647 A1* | 8/2002 | Maeno | H04L 45/44 370/238.1 |
| 2002/0196494 A1 | 12/2002 | McGuire, Jr. | |
| 2006/0221865 A1 | 10/2006 | Hawbaker et al. | |
| 2009/0087184 A1* | 4/2009 | Gao | H04J 14/0227 398/79 |
| 2011/0299536 A1 | 12/2011 | Cheng et al. | |
| 2012/0230185 A1 | 9/2012 | Yong | |
| 2013/0121141 A1 | 5/2013 | Hao | |
| 2013/0286846 A1* | 10/2013 | Atlas | H04L 45/34 370/236 |
| 2013/0287026 A1* | 10/2013 | Davie | H04L 49/70 370/392 |
| 2013/0301407 A1 | 11/2013 | Zhou et al. | |
| 2014/0119367 A1 | 5/2014 | Han et al. | |
| 2014/0301401 A1 | 10/2014 | Wang et al. | |
| 2014/0325038 A1* | 10/2014 | Kis | H04L 41/0803 709/220 |
| 2014/0362709 A1 | 12/2014 | Kashyap et al. | |
| 2015/0019712 A1 | 1/2015 | Senthilkumar | |
| 2015/0043378 A1* | 2/2015 | Bardgett | H04L 12/4641 370/254 |
| 2015/0043589 A1 | 2/2015 | Han et al. | |
| 2015/0063802 A1 | 3/2015 | Bahadur et al. | |
| 2015/0103844 A1 | 4/2015 | Zhao et al. | |
| 2015/0104166 A1 | 4/2015 | Patel et al. | |
| 2015/0117451 A1 | 4/2015 | Kaneriya et al. | |
| 2015/0220740 A1 | 8/2015 | Patel et al. | |
| 2015/0244605 A1* | 8/2015 | Grandi | H04L 45/026 370/248 |
| 2015/0244607 A1* | 8/2015 | Han | H04L 45/02 370/254 |
| 2015/0281072 A1 | 10/2015 | Arumugan et al. | |
| 2015/0350059 A1 | 12/2015 | Chunduri et al. | |
| 2015/0381428 A1 | 12/2015 | Ong | |
| 2016/0006609 A1 | 1/2016 | Zhao | |
| 2016/0014023 A1* | 1/2016 | He | H04L 45/64 370/408 |
| 2016/0050156 A1 | 2/2016 | Bergeron | |
| 2016/0062746 A1 | 3/2016 | Chiosi et al. | |
| 2016/0072696 A1* | 3/2016 | He | H04L 45/021 370/254 |
| 2016/0156480 A1* | 6/2016 | Liu | H04L 45/64 370/390 |
| 2016/0182400 A1 | 6/2016 | Ceccarelli et al. | |
| 2016/0182982 A1 | 6/2016 | Schmidtke et al. | |
| 2016/0197824 A1 | 7/2016 | Lin et al. | |
| 2016/0248664 A1 | 8/2016 | Huang | |
| 2016/0269272 A1 | 9/2016 | Li et al. | |
| 2016/0315866 A1 | 10/2016 | Thapar et al. | |

FOREIGN PATENT DOCUMENTS

| | | |
|---|---|---|
| CN | 104283722 A | 1/2015 |
| CN | 104283791 A | 1/2015 |
| CN | 104320345 A | 1/2015 |
| EP | 2814213 A1 | 12/2014 |
| WO | 2011147373 A1 | 12/2011 |

OTHER PUBLICATIONS

Foreign Communication From a Counterpart Application, PCT Application No. PCT/CN2016/078735, International Search Report dated Jul. 6, 2016, 7 pages.

Foreign Communication From a Counterpart Application, PCT Application No. PCT/CN2016/078735, Written Opinion dated Jul. 6, 2016, 4 pages.

Partial English Translation and Abstract of Chinese Patent Application No. CN104320345, Aug. 22, 2016, 5 pages.

Foreign Communication From a Counterpart Application, PCT Application No. PCT/CN2016/078734, International Search Report dated Jun. 29, 2016, 7 pages.

Foreign Communication From a Counterpart Application, PCT Application No. PCT/CN2016/078734, Written Opinion dated Jun. 29, 2016, 4 pages.

Foreign Communication From a Counterpart Application, PCT Application No. PCT/CN2016/078863, International Search Report dated Jul. 14, 2016, 7 pages.

Foreign Communication From a Counterpart Application, PCT Application No. PCT/CN2016/078863, Written Opinion dated Jul. 14, 2016, 4 pages.

Office Action dated Nov. 4, 2016, 26 pages, U.S. Appl. No. 14/718,941, filed May 21, 2015.

Office Action dated Feb. 10, 2017, 22 pages, U.S. Appl. No. 14/718,949, filed May 21, 2015.

Office Action dated Aug. 24, 2017, 22 pages, U.S. Appl. No. 14/718,849, filed May 21, 2015.

* cited by examiner

TRANSPORT SOFTWARE DEFINED NETWORKING (SDN)—LOGICAL TO PHYSICAL TOPOLOGY DISCOVERY

TECHNICAL FIELD

The present invention relates to a system and method for wireless communications, and, in particular, to a system and method for logic to physical topology discovery.

BACKGROUND

Conventional computer networks are built from a large number of network devices, such as routers, switches, and/or other hardware. Management of a large network can be complex and costly. It is believed that the complexity can be addressed by separating the bundling of control and data forwarding in traditional routers and replacing the use of fully distributed protocols for network control with centralized protocols. For example, data forwarding (e.g. data plane) is decoupled from control decisions (e.g. control plane), such as routing, resources and other management functionalities in a centrally-controlled network. The decoupling also allows the data plane and the control plane to operate on different hardware, in different runtime environments, and/or operate using different models. In the centrally-controlled network, network intelligence is logically centralized in software-based controllers. Thus, network devices become packet forwarding devices that are managed and controlled by the centralized controllers.

SUMMARY

A physical layer network element is disclosed herein. In one embodiment, the physical layer network element may comprise one or more physical ports, a network packet interface card, and a processor coupled to the network packet interface card. The processor and the network packet interface card may be configured to inspect adjacency discovery messages forwarded across the network packet interface card between adjacent logical nodes operating at a network layer and map at least one of the physical ports to at least one of the adjacent logical nodes, wherein the network packet interface card and the processor are not configured to modify header information contained in the adjacency discovery messages forwarded across the network packet interface card.

In another embodiment, the disclosure includes a method of inspecting network layer broadcast messages by a physical layer network packet interface card. The method may comprise receiving a bit stream comprising network layer adjacency discovery messages and network layer maintenance messages, inspecting, by a processor, the network layer messages to determine a mapping between at least one of adjacent network layer nodes and at least one of physical layer ports, and advertising, by the processor, the mapping to a transport software defined networking (SDN) controller to support creation of a physical layer topology to network layer topology mapping.

In another embodiment, the disclosure includes another method of mapping a physical topology to a logical topology by a transport software defined networking controller (T-SDNC). The method may comprise receiving physical layer adjacency discovery messages from physical layer network elements that indicate physical layer port adjacency information, determining a physical topology based on the physical layer adjacency discovery messages, and receiving network layer adjacency discovery messages from logical nodes operating at a network layer. The method may further comprise determining a logical topology based on the network layer adjacency discovery messages, receiving advertisement messages from the physical layer network elements each comprising a mapping between an adjacent logical node and a physical layer port, and determining, by a topology mapping module, a relationship of the physical topology and the logical topology based on the advertisement message mappings.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some networks, routers and switches are placed and configured in a way that defines the flow of data in a network. Subsequent changes to the routers and/or switches may be expensive as physical locations and/or hardware changes may require manual configurations. Software defined networking (SDN) is a networking paradigm where the management of data flow (e.g. control plane) and the delivery of data (e.g. data plane) are decoupled, which creates a flexible network through dynamic management and control. In an SDN network, network devices (e.g. routers and/or switches) are controlled and managed by one or more SDN controllers (SDNCs). An SDNC may be any device configured to control and manage an SDN domain. The SDNCs make routing decisions and then communicate the routing decisions to the network devices. For example, the SDNCs compute the best paths for routing packets from one node to another node based on some network topology information and then download route tables, switching tables, or flow tables to all network devices along the best path. Then, the network devices perform data forwarding functions according to the route tables received from the SDNCs. The SDNCs also modify the behavior of an SDN network dynamically to adapt to changes in the network (e.g. infrastructure changes, new applications and/or service deployments, and/or business requirement changes).

Network transport layers include layer 0 (e.g., dense wavelength division multiplexing (DWDM), photonics) and open systems interconnection (OSI) layer 1 (e.g., synchronous optical network (SONET)/synchronous digital hierarchy (SDH) and optical transport network (OTN)). Accordingly, transport SDNCs (T-SDNCs) operate primarily at layers 0 and 1. Without employing the transport layer's knowledge of mapping from layer 3 (network layer) topology to transport/physical layer topology, it may be challenging or even impossible to optimize or take actions across layers.

Disclosed herein are mechanisms for discovering a mapping between a physical topology and a logical topology in a transport SDN network. For example, a physical layer network element receives bit streams comprising network layer adjacency discovery messages and network layer maintenance messages. The physical layer network element comprises a plurality of physical ports (e.g. local physical ports). The physical layer network element inspects (e.g. snoops) header information of each of the network layer adjacency discovery messages to determine a mapping between a local physical port and a network layer logical node adjacent to the local physical port. Physical layer network elements then distribute the determined mappings of network layer logical nodes and adjacent physical ports at the physical layer, for example via advertisement messages. Network devices at the physical layer, including at least one T-SDNC, receive the advertisement messages. A T-SDNC receives physical layer adjacency discovery messages from physical layer network elements that indicate physical layer port adjacency information. The T-SDNC determines a physical topology based on inspecting the physical layer adjacency discovery messages. The T-SDNC receives network layer adjacency discovery messages from logical nodes operating at the network layer. The T-SDNC determines a logical topology based on inspecting the network layer adjacency discovery messages. Thus, the T-SDNC determines a relationship or mapping of the physical topology and the logical topology based on the determined physical topology, the determined logical topology, and/or the received advertisement message mappings. The T-SDNC is configured to employ algorithms operating at the physical layer and/or the network layer to optimize communication routing using the relationship of the physical topology and the logical topology.

Figure 1:
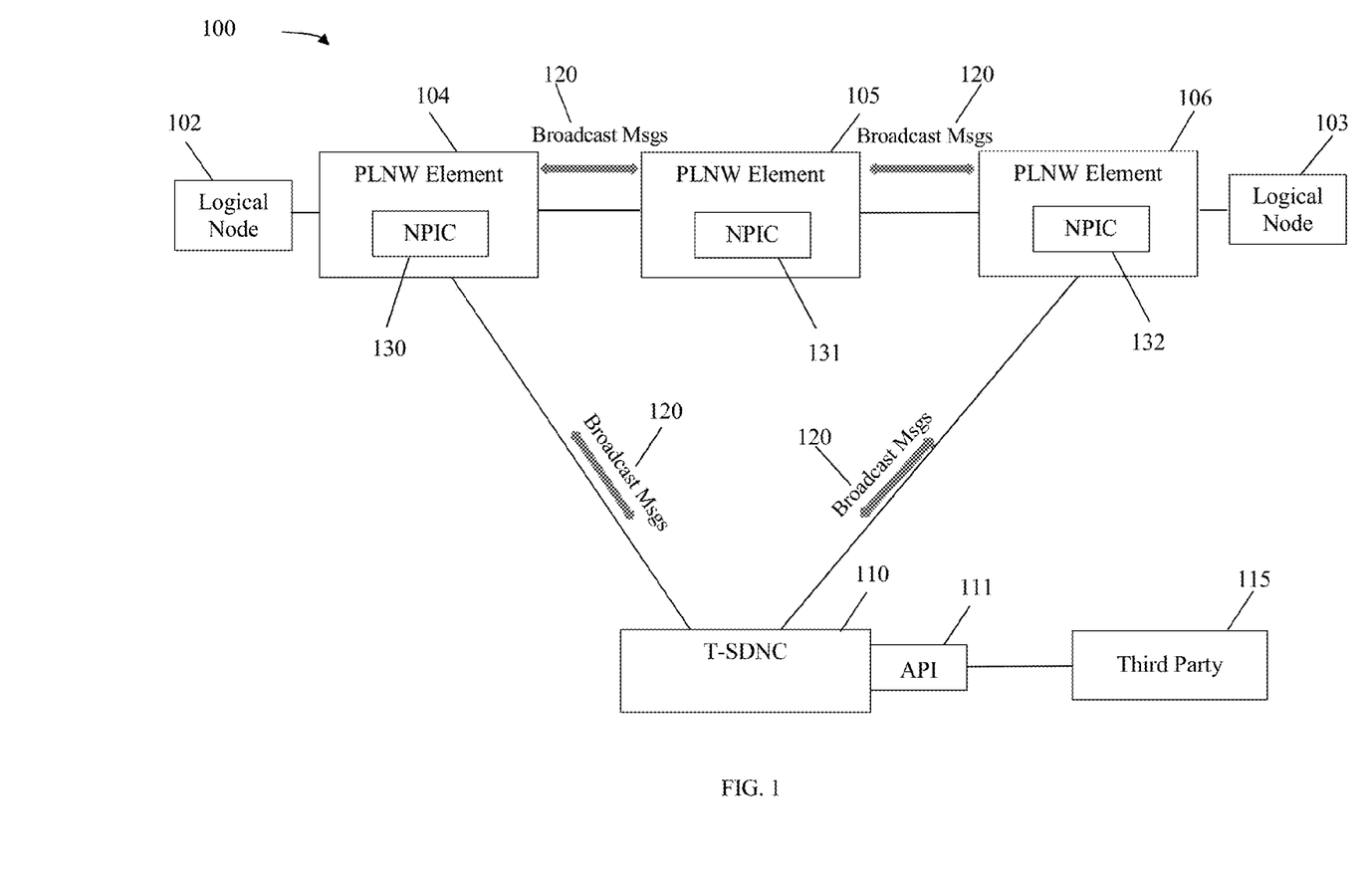
FIG. 1 is a schematic diagram of an embodiment of a communication network.

FIG. 1 is a schematic diagram of an embodiment of a communication network 100. Network 100 comprises a plurality of physical layer network (PLNW) elements 104-106, a plurality of logical nodes 102 and 103, an application programming interface (API) 111, and one or more transport software defined networking controllers (T-SDNCs) 110. The physical layer network elements 104-106 are communicatively coupled via optical links although electrical links could be used. The T-SDNC 110 is communicatively coupled to the physical layer network elements 104-106 via optical links, electrical links, or combinations thereof. The logical nodes 102 and 103 are communicatively coupled to the physical layer network elements 104-106 via optical links, electrical links, or combinations thereof. The logical nodes 102 and 103 may be any physical device (e.g. router) or logical device configured to perform data packet forwarding functions between different networks. The logical nodes 102 and 103 operate at the network layer of the OSI model.

Connections and/or other links shown in FIG. 1 include physical connections, such as fiber optic links, electrical links, wireless links, and/or logic connections. The connection comprises a single link, a series of parallel links, a plurality of interconnected nodes, and/or various combinations thereof used to transport data between network devices.

The physical layer network elements 104-106 may be any physical device (e.g. switch) configured to perform data forwarding functions according to SDN routes specified by T-SDNC(s) 110 in an SDN domain. The physical layer network element 104 comprises a plurality of physical ports, such as input data ports, output data ports, control ports, etc. (e.g. ports 215, 216, 310, or 311), one or more network packet interface cards (NPICs) 130-132, respectively, and a processor. The processor is coupled to the network packet interface card and is configured to perform a variety of functionality. In an embodiment, the physical layer network element 104 performs functions of an optical switch. An upstream port is mapped to a downstream port by the physical layer network element 104. For example, wavelengths may be routed from an upstream port to a mapped downstream port by the physical layer network element 104. For example, wavelengths are routed from the network packet interface card 130 to the link between the physical layer network elements 104 and 105, then through the link between the physical layer network elements 105 and 106, and finally to the network packet interface card 132. The wavelengths are further routed from the network packet interface card 132 to a destination, e.g. via the logical node 103. The network packet interface card 130 and the processor may not be configured to modify header information contained in messages, for example header contained in broadcast messages 120, forwarded across the network packet interface card 130. Said in other words, the physical layer network element 104 forwards an encoded data packet from a first port to a second port without making modification to a header of the encoded data packet.

The network packet interface card 130 receives bit streams comprising broadcast messages 120, such as adjacency discovery messages and network layer maintenance messages. The adjacency discovery message may be any of an open shortest path first (OSPF) message, an intermediate system to intermediate system (IS-IS) message, a border gateway protocol (BGP) message, or another type of adjacency discovery message. The adjacency discovery message may be any of a network layer adjacency discovery message or a physical layer adjacency discovery message. The network layer adjacency discovery messages are broadcasted between communicatively coupled logical nodes 102 and 103 operating at the network layer of the OSI model and comprise information of logical node 102/103 adjacencies. The physical layer adjacency discovery messages are broadcasted between communicatively coupled physical layer network elements 104-106 operating at the physical layer of the open systems interconnection model and comprise information of physical layer network element 104-106 adjacencies.

The network packet interface card 130 inspects the network layer adjacency discovery messages, for example by reviewing the contents of the discovery messages via a snooping utility. As used herein, inspecting indicates reviewing contents of a packet traversing an interface without altering the packet. The network layer adjacency discovery message between logical nodes 102 and 103 may be an OSPF hello message, an IS-IS hello message, or another type of adjacency discovery message. The network layer adjacency discovery message comprises information of physical ports of the physical layer network element and adjacent logical nodes, such as physical ports of physical layer network element 104 and logical nodes 102 and 103. The network packet interface card 130 then maps the physical port to the adjacent logical node 102.

For example, headers of the network layer adjacency discovery messages are inspected by the physical layer network element 104 and adjacency information of physical ports and logical nodes 102 and 103 is obtained by the physical layer network element 104. A mapping of a physical port to an adjacent logical node 102 is obtained by inspecting a header of a network layer adjacency discovery message. The physical layer network element 104 then transmits advertisement messages at the physical layer to broadcast the mapping of the physical port to the adjacent logical node 102. In an embodiment, the advertisement message may be an OSPF link state advertisement (LSA) message. For example, the network packet interface card 130 or the physical layer network element 104 may append the mapping information to the OSPF LSA message. The mapping information or the advertisement message comprises an identification of the physical layer network element 104, a physical port identification, and an identification of the adjacent logical node 102.

The T-SDNC 110 is any device configured to control and manage an SDN domain. A T-SDNC 110 may comprise a memory, a processor, and transceivers (Tx/Rx), which may be transmitters, receivers, or combinations thereof. Each T-SDNC 110 is located within an SDN domain physically and/or logically. The processor may comprise a topology mapping module. A third party 115 may have access to the T-SDNC 110 through an application programming interface (API) 111. T-SDNCs 110 perform a variety of control plane functions that comprise generating and obtaining routing information, network topology, and/or network state information. For example, the T-SDNC 110 generates and advertises SDN specific topology information of the SDN domain that the T-SDNC 110 manages and/or supports. Accordingly, the T-SDNC 110 receives SDN specific topology information of other SDN domains that are supported and/or managed by other SDNCs 110. Each T-SDNC 110 configures physical layer network elements 104-106 in an SDN domain that the T-SDNC 110 manages, for example, by transmitting flow tables to the physical layer network elements 104-106. Each T-SDNC 110 communicates with a physical layer network element 104 over a controller-device interface, which may employ any standardized protocol (e.g. the OpenFlow protocol). It should be noted that prior to advertising SDN specific topology information, each T-SDNC 110 advertises traditional link state information which has been defined in interior gateway protocol (IGP).

The T-SDNC 110 receives physical layer adjacency discovery messages of physical ports transmitted by physical layer network elements 104-106. For example, a physical layer adjacency discovery message comprises an identification of a first physical layer network element 104, an identification of a first physical port that is part of the first physical layer network element 104, an identification of a second physical layer network element 105, and/or an identification of a second physical port that is part of the second physical layer network element 105. The first and second physical ports are adjacent at the physical layer and the first and second physical layer network elements 104 and 105 are adjacent at the physical layer. A physical topology is determined by the T-SDNC 110 based on the physical layer adjacency discovery messages. For example, the T-SDNC 110 may build a topology based on identifications of the physical ports and physical layer network elements 104-106 in the physical layer adjacency discovery messages. For example, the T-SDNC 110 may determine a physical topology as shown in FIG. 2.

Figure 2:
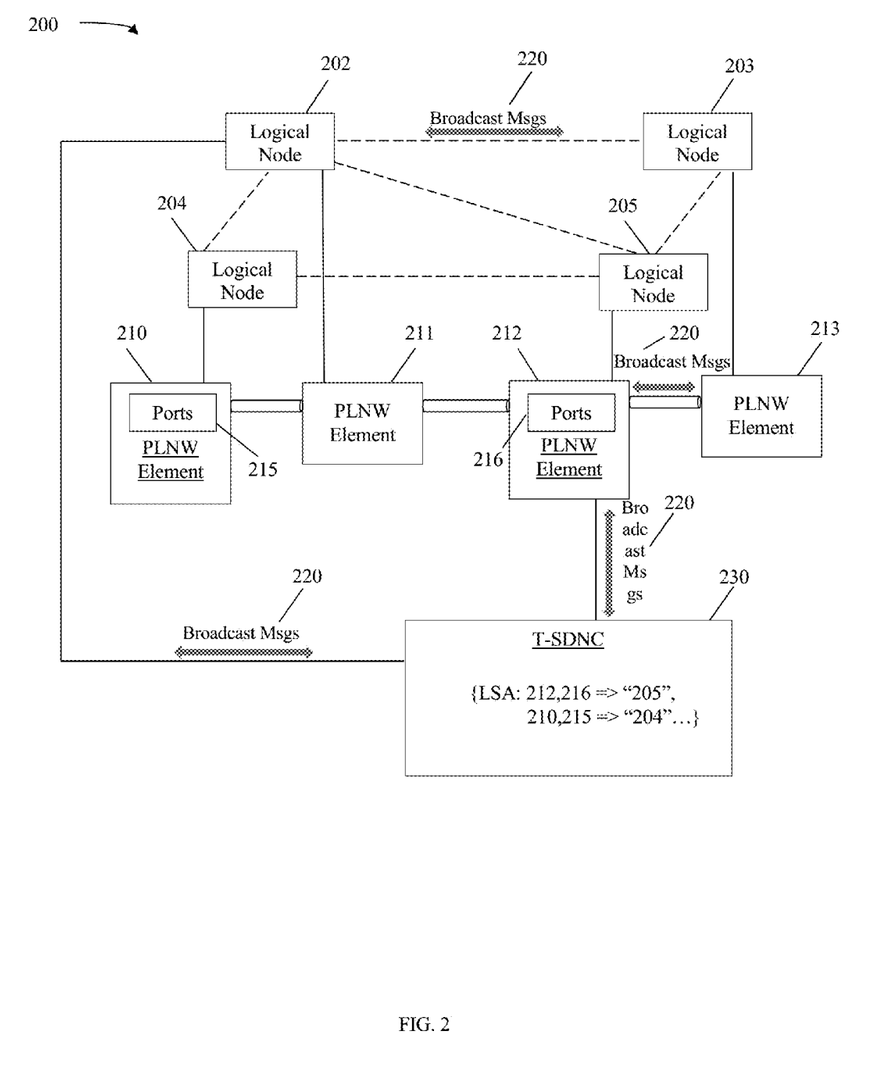
FIG. 2 is a schematic diagram of another embodiment of a communication network.

FIG. 2 is a schematic diagram of another embodiment of a communication network 200. Network 200 comprises logical nodes 202, 203, 204, and 205, physical layer network (PLNW) elements 210, 211, 212, and 213, T-SDNC 230, and broadcast messages 220, which may be substantially similar to logical nodes 102 and 103, physical layer network elements 104, 105, and 106, T-SDNC 110, and broadcast messages 120, respectively. The T-SDNC 230 receives network layer adjacency discovery messages. The physical layer network elements 210-213 receive bit streams comprising broadcast messages 220 (e.g. adjacency discovery messages and network layer maintenance messages). The adjacency discovery message may be any of an open shortest path first (OSPF) message, an intermediate system to intermediate system (IS-IS) message, a border gateway protocol (BGP) message, or another type of adjacency discovery message. The adjacency discovery message may be any of a network layer adjacency discovery message or a physical layer adjacency discovery message. The network layer adjacency discovery messages are broadcasted between communicatively coupled logical nodes 202-205 operating at the network layer of the OSI model and comprise information of logical node 202-205 adjacencies. The physical layer adjacency discovery messages are broadcasted between communicatively coupled physical layer network elements 210-213 operating at the physical layer of the open systems interconnection model and comprise information of physical layer network element 210-213 adjacencies.

The network layer adjacency discovery messages 220 comprise identifications of adjacent logical nodes 202-205. Similarly, a logical topology is determined by the T-SDNC 230 based on the received network layer adjacency discovery messages 220. For example, the T-SDNC 230 may determine that logical nodes 202-205 are logically connected in a mesh topology. Additionally, the advertisement messages from the physical layer network elements 210-213 are received at the T-SDNC 230. For example, an advertisement message transmitted by the physical layer network element 210 comprises information that one of the ports 215 of the physical layer network element 210 is adjacent to (e.g. directly coupled to) the logical node 204. An advertisement message transmitted by the physical layer network element 212 comprises information that one of the ports 216 of the physical layer network element 212 is adjacent to the logical node 205. Similar advertisement messages are transmitted by physical layer network elements 211 and 213. The advertisement messages are received by the T-SDNC 230. A relationship of the physical topology and the logical topology is thus determined by the T-SDNC 230 based on the determined physical topology, the determined logical topology, and/or the received advertisement messages.

Figure 3:
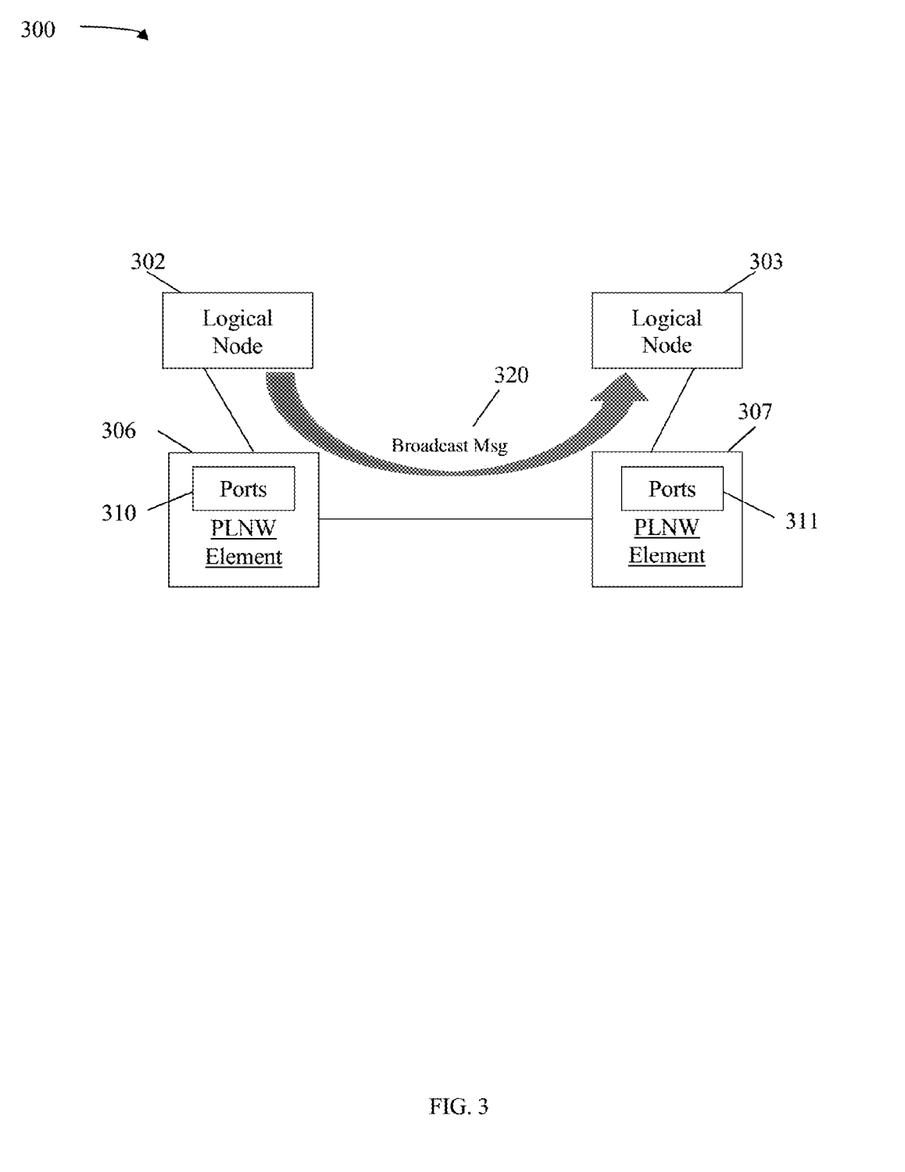
FIG. 3 is a schematic diagram of physical layer network elements inspecting network layer broadcast messages.

FIG. 3 is a schematic diagram of a network 300 comprising physical layer network (PLNW) elements 306 and 307 inspecting broadcast messages 320 transmitted by network layer logical nodes 302 and 303. Network 300 comprises logical nodes 302 and 203 and physical layer network elements 306 and 307, which may be substantially similar to logical nodes 102 and 103 and physical layer network elements 104, 105, and 106, respectively. The ports 310 are part of the physical layer network element 306 and the ports 311 are part of the physical layer network element 307 respectively. Logical node 302 transmits a broadcast message 320 toward logical node 303. Logical nodes 302 and 303 are communicatively coupled via physical layer network elements 306 and 307. The physical layer network element 306 and the physical layer network element 307 may each inspect the broadcast message 320 as the message traverses the physical layer network elements. The broadcast message 320 may be a network layer adjacency discovery message, for example an OSPF hello message, an IS-IS hello message, a BGP hello message, etc., or a network layer maintenance message. The physical layer network element 306 and the physical layer network element 307 may inspect header information of the broadcast message 320 forwarded across a first port (e.g. a first of ports 310) and a second port (e.g. a first of ports 311), respectively.

By inspecting header information of the broadcast message 320, the physical layer network element 306 determines that a port comprised in ports 310 is adjacent to the logical node 302 and the physical layer network element 307 determines that a port comprised in ports 311 is adjacent to the logical node 303. Then the physical layer network element 306 transmits an advertisement message, such as an LSA, at the physical layer comprising identification information of the physical layer network element 306, identification information of the first port of ports 310, and/or identification information of the logical node 302. Similarly, the physical layer network element 307 transmits an advertisement message at the physical layer comprising identification information of the physical layer network element 307, identification information of the second port of ports 311, and/or identification information of the logical node 303. The advertisements may be employed by a T-SDNC, such as T-SDNC 110 or 230 to support creation of a physical layer topology to network layer topology mapping.

Figure 4:
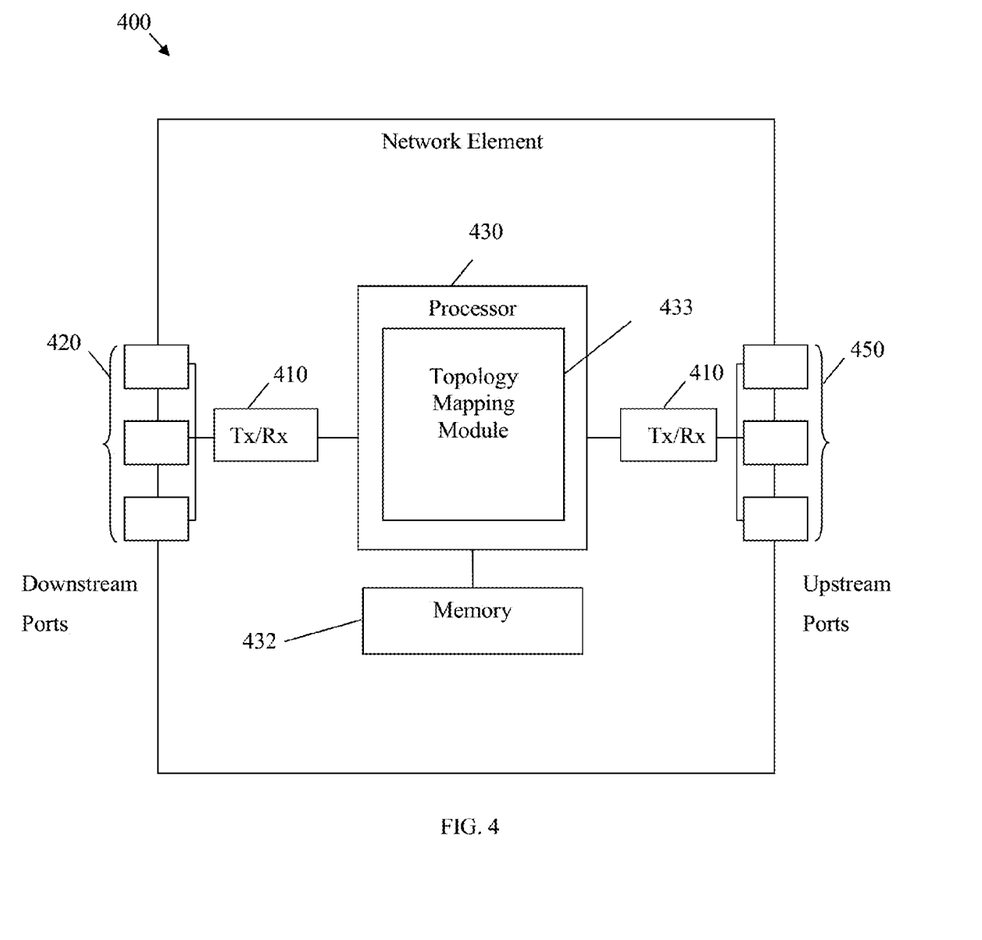
FIG. 4 is a schematic diagram of an embodiment of a network element (NE).

FIG. 4 is a schematic diagram of an embodiment of a network element (NE) 400, which may act as an SDNC (e.g. T-SDNC 110 and/or 230) or a network device (e.g. physical layer network elements 104-106, 210-213, 306 and 307 or logical nodes 102 and 103, 202-205, or 302 and 303, etc.) in an SDN domain. NE 400 may be configured to determine routes and/or links in an SDN domain that are visible to other interconnected SDN domains, generate SDN specific topology information, advertise the SDN specific topology information to the interconnected SDN domains, and/or map logical topology to physical topology, depending on the embodiment. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 400. For instance, the features/methods in the disclosure may be implemented using hardware, firmware, and/or software installed to run on hardware.

As shown in FIG. 4, the NE 400 may comprise transceivers (Tx/Rx) 410, which may be transmitters, receivers, or combinations thereof. A Tx/Rx 410 may be coupled to plurality of downstream ports 420 for transmitting and/or receiving frames from other nodes and a Tx/Rx 410 may be coupled to plurality of upstream ports 450 for transmitting and/or receiving frames from other nodes, respectively. A processor 430 may be coupled to the Tx/Rx 410 to process the frames and/or determine which nodes to send the frames to. The processor 430 may comprise one or more multi-core processors and/or memory devices 432, which may function as data stores, buffers, etc. Processor 430 may be implemented as a general processor or may be part of one or more application specific integrated circuits (ASICs) and/or digital signal processors (DSPs).

Figure 5:
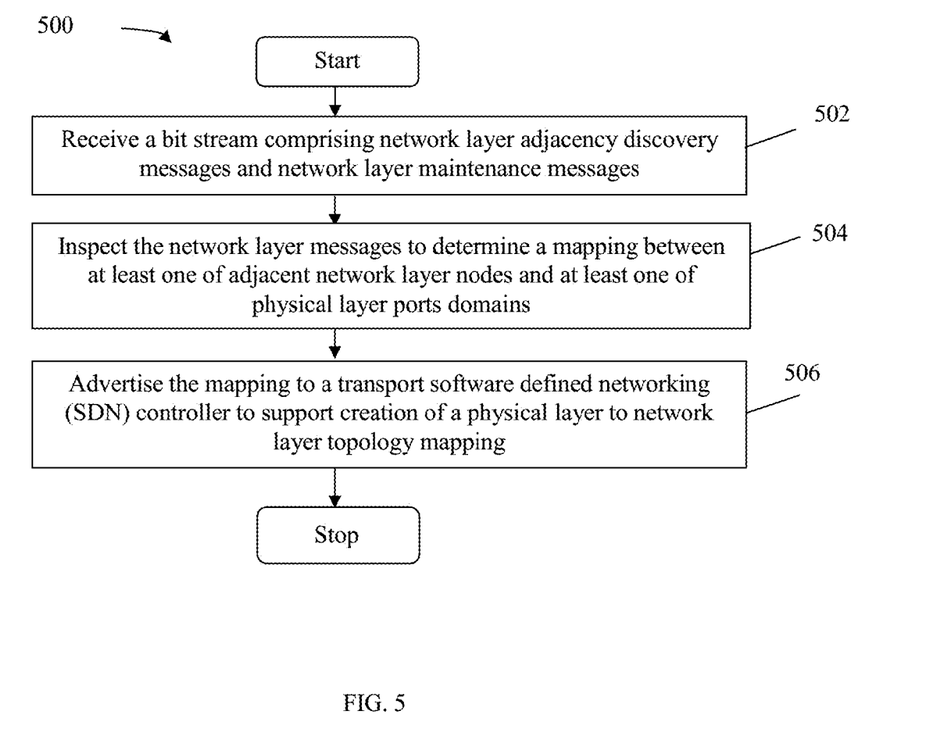
FIG. 5 is a flowchart of an embodiment of a method for inspecting adjacency discovery messages.
Figure 6:
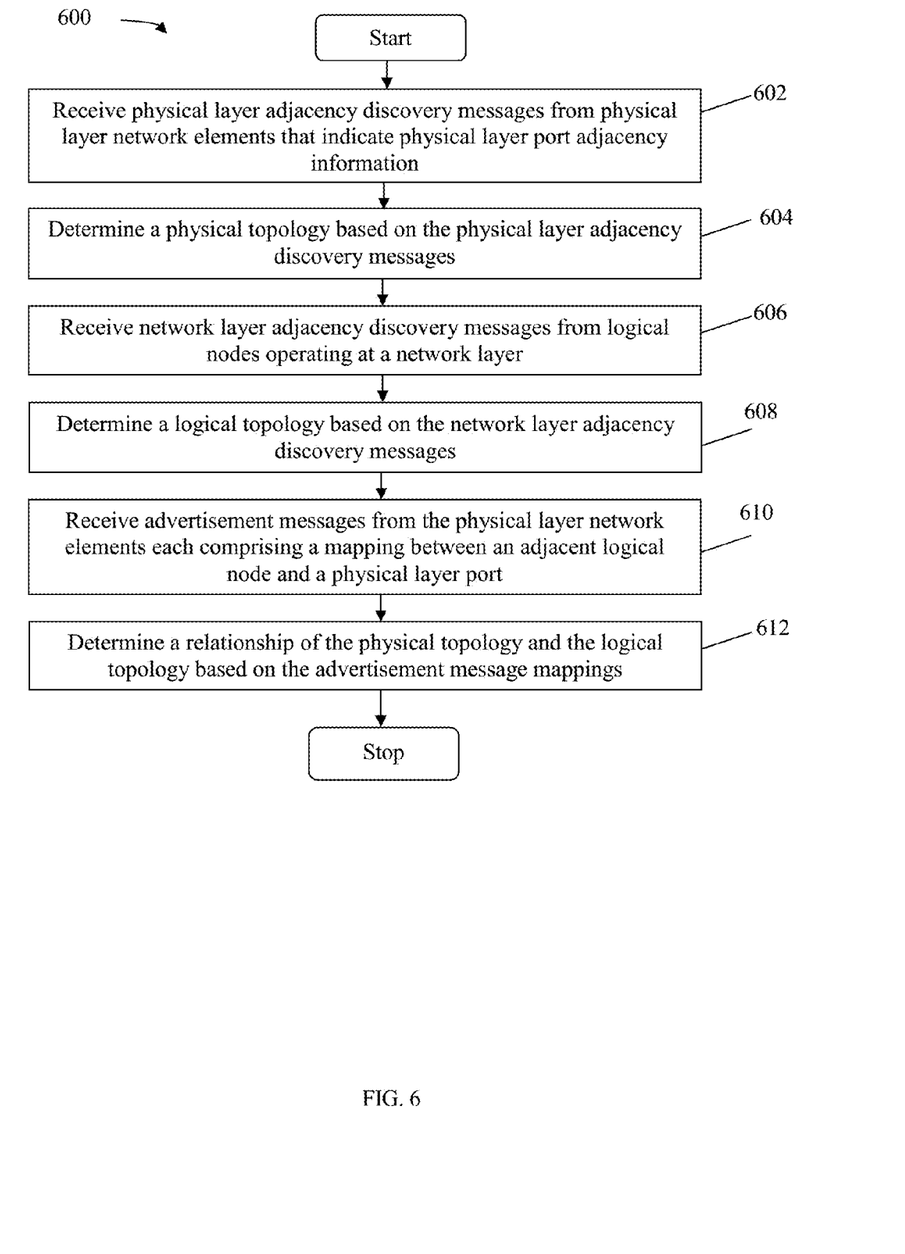
FIG. 6 is a flowchart of an embodiment of a method for mapping a physical topology to a logical topology.

Processor 430 may comprise a topology mapping module 433, which may implement an adjacency discovery message inspecting method 500 and/or a physical and logical topology mapping method 600 as discussed more fully below. In an alternative embodiment, the topology mapping module 433 may be implemented as instructions stored in the memory devices 432, which may be executed by processor 430. The memory device 432 may comprise a cache for temporarily storing content, e.g., a Random Access Memory (RAM). Additionally, the memory device 432 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 400, at least one of the processor 430 and/or memory device 432 are changed, transforming the NE 400 in part into a particular machine or apparatus, e.g., a physical topology to logical topology mapping architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

FIG. 5 is a flowchart of an embodiment of a method 500 for inspecting adjacency discovery messages, which may be implemented in a physical layer network element, such as physical layer network elements 104-106, 210-213, or 306 and 307. At step 502, method 500 receives a bit stream comprising network layer adjacency discovery messages and/or network layer maintenance messages. During operation of the physical layer network element, method 500 inspects adjacency discovery messages upon receipt of bit streams. At step 504, method 500 inspects, by a processor, the network layer messages to determine a mapping between at least one of adjacent network layer nodes (e.g., logical nodes 102 and 103, 202-205, or 302 and 303) and at least one of physical layer ports (e.g., ports 215 and 216, see FIG.

2). At step 506, method 500 advertises, by the processor, the mapping to a transport software defined networking (SDN) controller (e.g., T-SDNC 110 or 230) to support creation of a physical layer topology to network layer topology mapping.

FIG. 6 is a flowchart of an embodiment of a method 600 for mapping a physical topology to a logical topology, which may be implemented in a T-SDNC, such as T-SDNC 110 or 230. During operation of the T-SDNC, method 600 maps a physical topology to a logical topology upon receipt of advertisement messages from physical layer network elements, physical layer adjacency discovery messages, and logical layer adjacency discovery messages. At step 602, method 600 receives physical layer adjacency discovery messages (e.g., broadcast messages 120, 220, or 320) from physical layer network elements (e.g., physical layer network elements 104-106, 210-213, or 306 and 307) that indicate physical layer port adjacency information. At step 604, method 600 determines a physical topology based on the physical layer adjacency discovery messages. At step 606, method 600 receives network layer adjacency discovery messages from logical nodes (e.g., logical nodes 102 and 103, 202-205, or 302 and 303) operating at a network layer.

At step 608, method 600 determines a logical topology based on the network layer adjacency discovery messages. At step 610, method 600 receives advertisement messages from the physical layer network elements each comprising a mapping between an adjacent logical node and a physical layer port. At step 612, method 600 determines, by a topology mapping module, a relationship of the physical topology and the logical topology based on the advertisement message and employs the relationship to map the physical topology to the logical topology.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A physical layer network element, comprising:
   a plurality of physical ports;
   a network packet interface comprising a processor, the network packet interface configured to:
   inspect a header of an adjacency discovery message forwarded across the network packet interface from a first logical node to a second logical node, wherein the header indicates that a first physical port of the plurality of physical ports is adjacent to the first logical node; and
   map the first physical port of the plurality of physical ports to the first logical node.

2. The physical layer network element of claim 1, wherein the network packet interface and the processor are not configured to modify header information contained in the header of the adjacency discovery message forwarded across the network packet interface.

3. The physical layer network element of claim 1, wherein the network packet interface is further configured to map an upstream port to a downstream port.

4. The physical layer network element of claim 1, wherein the network packet interface is configured to transmit or cause transmission of an advertisement message at a physical layer, wherein the advertisement message comprises mapping information of the first physical port of the plurality of physical ports to the first logical node.

5. The physical layer network element of claim 4, wherein the advertisement message comprises at least one of an identifier of the first physical port of the plurality of physical ports, an identification of the physical layer network element, or an identification of the first logical node.

6. The physical layer network element of claim 4, wherein the advertisement message is transmitted to a transport software defined networking (SDN) controller to support creation of a physical to logical topology mapping at the transport SDN controller.

7. The physical layer network element of claim 6, wherein transmitting the advertisement message to the transport SDN controller comprises broadcasting the advertisement message to each of a plurality of adjacent physical layer nodes.

8. The physical layer network element of claim 1, further comprising a transmitter configured to transmit the adjacency discovery message to a second physical layer network element, wherein the second physical layer network element is adjacent to the second logical node.

9. A method implemented in a physical layer network packet interface, comprising:
   receiving an adjacency discovery message from a network layer node;
   inspecting, by a processor, a header of the adjacency discovery message, wherein the header comprises a mapping between the network layer node and at least one physical layer port of a physical layer network element adjacent to the network layer node; and
   advertising, by the processor, the mapping to a transport software defined networking (SDN) controller to support creation of a physical layer topology to network layer topology mapping.

10. The method of claim 9, wherein the adjacency discovery message comprises at least one of an open shortest path first (OSPF) message, an intermediate system to intermediate system (IS-IS) message, or a border gateway protocol (BGP) message.

11. The method of claim 10, wherein the mapping is advertised to the transport SDN controller in a link state advertisement (LSA) message.

12. The method of claim 11, wherein the LSA message comprises at least one of an identification of the physical layer network element, the physical layer port of the physical layer network element, or an identification of the network layer node.

13. The method of claim 9, further comprising mapping an upstream port to a downstream port.

14. The method of claim 13, further comprising forwarding the adjacency discovery message from the physical layer port to a second physical layer port without modifying the header of the adjacency discovery message.

15. The method of claim 9, further comprising transmitting, by a transmitter coupled to the processor, the adjacency discovery message to a second physical layer network element, wherein the second physical layer network element is adjacent to a second network layer node.

16. A method implemented by a transport software defined networking (SDN) controller, comprising:
receiving a physical layer adjacency discovery message from a physical layer network element, wherein a header of the physical layer adjacency discovery message indicates a physical layer port of the physical layer network element that is adjacent to a first logical node;
receiving a network layer adjacency discovery message from the first logical node operating at a network layer, wherein the network layer adjacency discovery message indicates that the first logical node is adjacent to a second logical node operating at a network layer; and
receiving an advertisement message from the physical layer network element, wherein the advertisement message comprises a mapping between the first logical node and the physical layer port of the physical layer network element.

17. The method of claim 16, wherein the transport SDN controller operates at network transport layers.

18. The method of claim 17, wherein the network transport layers comprise layer 0 and open systems interconnection (OSI) layer 1.

19. The method of claim 17, wherein the transport SDN controller communicates with the physical layer network element and the network layer logical node via OpenFlow.

20. The method of claim 19, wherein the physical layer adjacency discovery message or the network layer adjacency discovery messages comprises at least one of an open shortest path first (OSPF) message, an intermediate system to intermediate system (IS-IS) message, and a border gateway protocol (BGP) message.

* * * * *